United States Patent
Uhl et al.

[11] Patent Number: 6,112,419
[45] Date of Patent: Sep. 5, 2000

[54] CUTTER HEAD WITH COVER FOR DRIVE PINION

[75] Inventors: Klaus-Martin Uhl, Baltmannsweiler; Joachim Hoffmann, Plochingen; Berthold Schell, Backnang, all of Germany

[73] Assignee: Andreas Stihl AG & Co., Germany

[21] Appl. No.: 09/204,994

[22] Filed: Dec. 2, 1998

[30] Foreign Application Priority Data

Dec. 2, 1997 [DE] Germany .................. 197 53 360

[51] Int. Cl.[7] ............................................. B27B 17/00
[52] U.S. Cl. ............................................ 30/383; 30/381
[58] Field of Search ....................... 30/122, 381–387

[56] References Cited

U.S. PATENT DOCUMENTS

| 4,916,818 | 4/1990 | Panek ............................... 30/383 |
| 5,718,050 | 2/1998 | Keller .......................... 30/383 X |

FOREIGN PATENT DOCUMENTS 7249    1/1980   European Pat. Off. ............. 30/122

*Primary Examiner*—Douglas D Watts
*Attorney, Agent, or Firm*—Robert W. Becker & Associates

[57] ABSTRACT

A cutter head assembly for a motor chain saw has a cutter head housing and a drive shaft mounted in and projecting from the cutter head housing. A drive pinion is mounted on the portion of the drive shaft projecting from the cutter head housing. A guide bar having a first end positioned adjacent to the drive pinion is provided. A saw chain is driven by the drive pinion and circulates on the guide bar. A cover covering the drive pinion and resting at least in an area of outgoing deflection of the saw chain at a housing wall of the cutter head housing defines a cuttings chamber open toward the guide bar. The first end of the guide bar is clamped between the housing wall of the cutter head housing end the cover. The cover has a cuttings ejection opening opposite the housing wall in the vicinity of the area of outgoing deflection. The cuttings ejection opening has a rim extending in a circulating direction of the saw chain and a ramp projecting from a first portion of the rim into the cutting chamber.

15 Claims, 5 Drawing Sheets

CUTTER HEAD WITH COVER FOR DRIVE PINION

BACKGROUND OF THE INVENTION

The present invention relates to a cutter head for a motor chainsaw, especially for a tree pruner, wherein the saw chain guided on a guide bar is driven by a drive pinion which is secured onto a portion of a drive shaft projecting from the housing. The guide bar is clamped between a housing side of the housing and a cover for the drive pinion. The cover rests at least over the area of outgoing deflection of the saw chain at the facing housing wall of the housing and thus delimits a cuttings chamber that is substantially open toward the guide bar.

Such cutter heads or cutter head assemblies are known. The saw chain driven by the drive pinion circulates on the guide bar which is clamped between an abutment surface of the housing and the drive pinion cover. The drive pinion cover encloses the pinion and rests with its circumferential rim at areas of the deflection portion of the saw chain at the facing housing wall so that a cuttings chamber is defined which is substantially open in a direction toward the guide bar. The circumferential rim is shortened at the underside of the housing so that wood cuttings that are entrained by the saw chain into the cuttings chamber can fall out under the force of gravity.

When working with motor chain saws in an overhead position, especially in connection with tree pruners, the ejection of wood cuttings at the underside of the cover facing the operator, is impractical because the operator would be subjected to a spray of cuttings which would impede working with the device.

It is therefore an object of the present invention to improve a cutter head of the aforementioned kind and provide it with a cover such that even for over head operation cuttings ejection without impacting the operator can be ensured.

SUMMARY OF THE INVENTION

This object is inventively solved in that the cuttings chamber has a cuttings ejection opening at a lateral surface of the cover opposite of the housing wall in the vicinity of the deflection area of the saw chain. The rim of the opening is provided with a ramp extending in the circulating direction of the saw chain and projecting into the cuttings chamber.

The inventive cuttings ejection opening allows a lateral ejection of cuttings from the cuttings chamber whereby the ramp forces the cuttings onto a laterally forwardly oriented trajectory. The wood cuttings entrained by the saw chain into the cutting chamber are thrown off within the deflection area of the drive pinion, retain substantially their kinetic energy and are then deflected along the ramp into a laterally forwardly directed path. The trajectory defined by the ramp geometry is thus oriented away from the operator so that the operator is not subjected to a spray of cuttings.

In order to favor a trajectory laterally away from the cover, it is expedient to embody the ramp such that in the circulating direction the rearward portion has an increasing slant.

In order to prevent lodging of wood cuttings in the area of the ramp, it is suggested that the inner longitudinal edge of the ramp in the circumferential direction is substantially resting at the housing wall over a large portion of its length.

The cuttings ejection opening is provided over advantageously an angle of 90°, beginning at the longitudinal center axis of the cover in the circulating direction of the saw chain, whereby the angle is preferably substantially 135°. The cuttings ejection opening, in a plan view onto the cover, with respect to the clockwise direction about the axis of rotation of the drive pinion, can be positioned substantially within the fourth quadrant.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 1–5.

Figure 1:
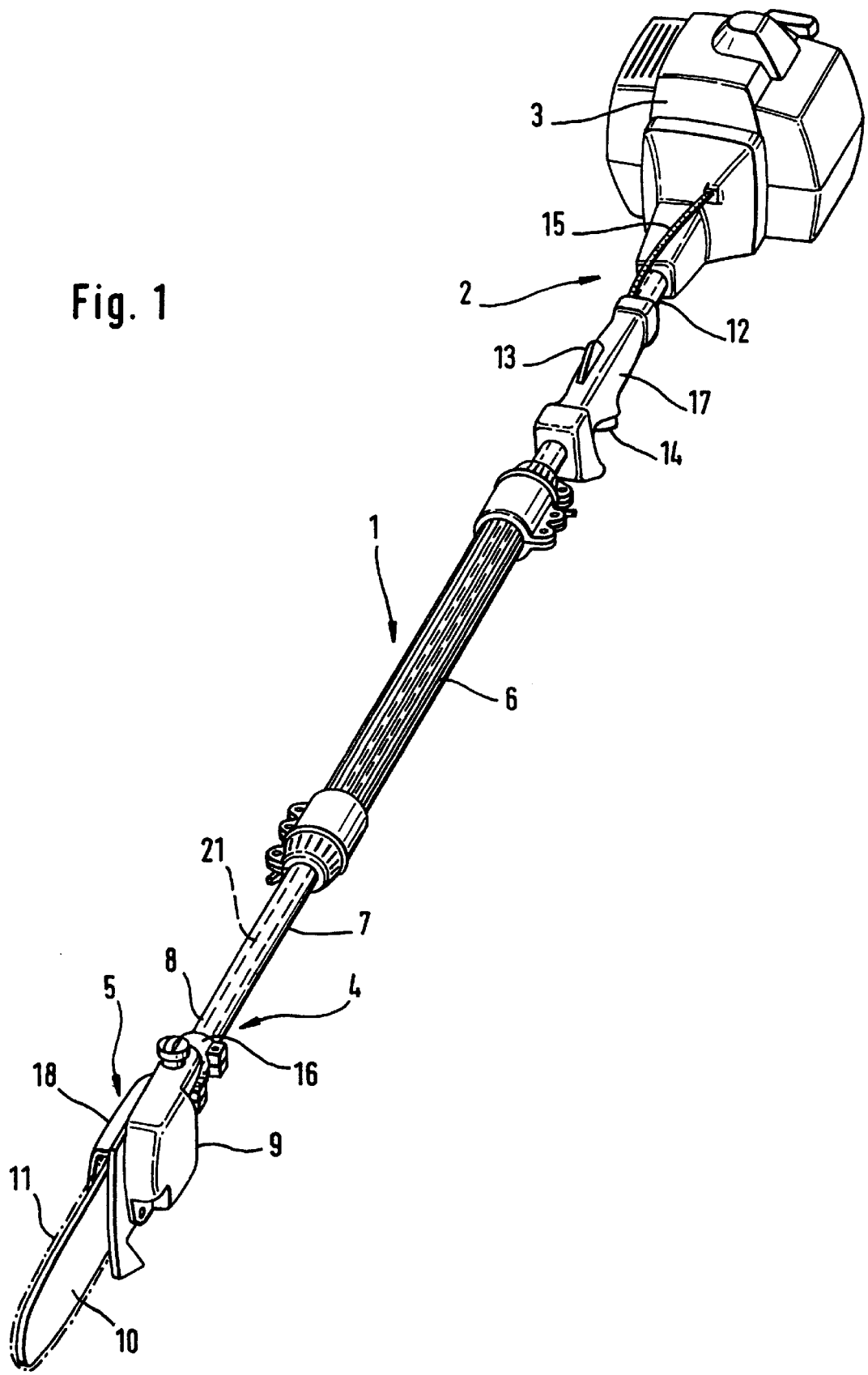
FIG. 1 is a schematic representation of a tree pruner.

The tree pruner represented as a hand-guided working tool in FIG. 1 serves to remove limbs from trees etc. while the operator is standing on the ground. The tree pruner is comprised of a telescopic rod 1 having at one end 2 a drive motor 3 and at the other end 4 a cutter head 5. As a drive motor 3 it is expedient to employ an internal combustion engine, for example, a two-stroke engine or a four-stroke engine. It is also possible to employ an electric motor.

The telescopic rod 1 is comprised of an outer tube 6 and an inner tube 7 that can be moved within the outer tube 6. The free end 8 supports the cutter head 5 which is comprised substantially of the housing 9 with an angular gear box. The input shaft of the angular gear box is connected to the drive shaft 21 supported within the telescopic rod 1 and is driven by the drive motor 3. The drive motor 3 drives, by the drive shaft 21 and the angular gear box in the housing 9, a saw chain 11 circulating on the guide bar 10.

The end of the outer tube 6 facing the drive motor 3 is provided with a connecting tube 12 which supports substantially the operating grip 17 having arranged thereat the gas throttle 14 as well as a gas throttle lock 13. The gas throttle 14 is connected by a cable pull 15 to a control element for operating the drive motor 3. The internal combustion engine secured on the connecting tube 12 has a non-represented carburetor having a throttle flap to be actuated by the cable pull 15.

The cutter head 5 is connected by a connecting clamp 16 to the free end 8 of the inner tube 7.

Figure 2:
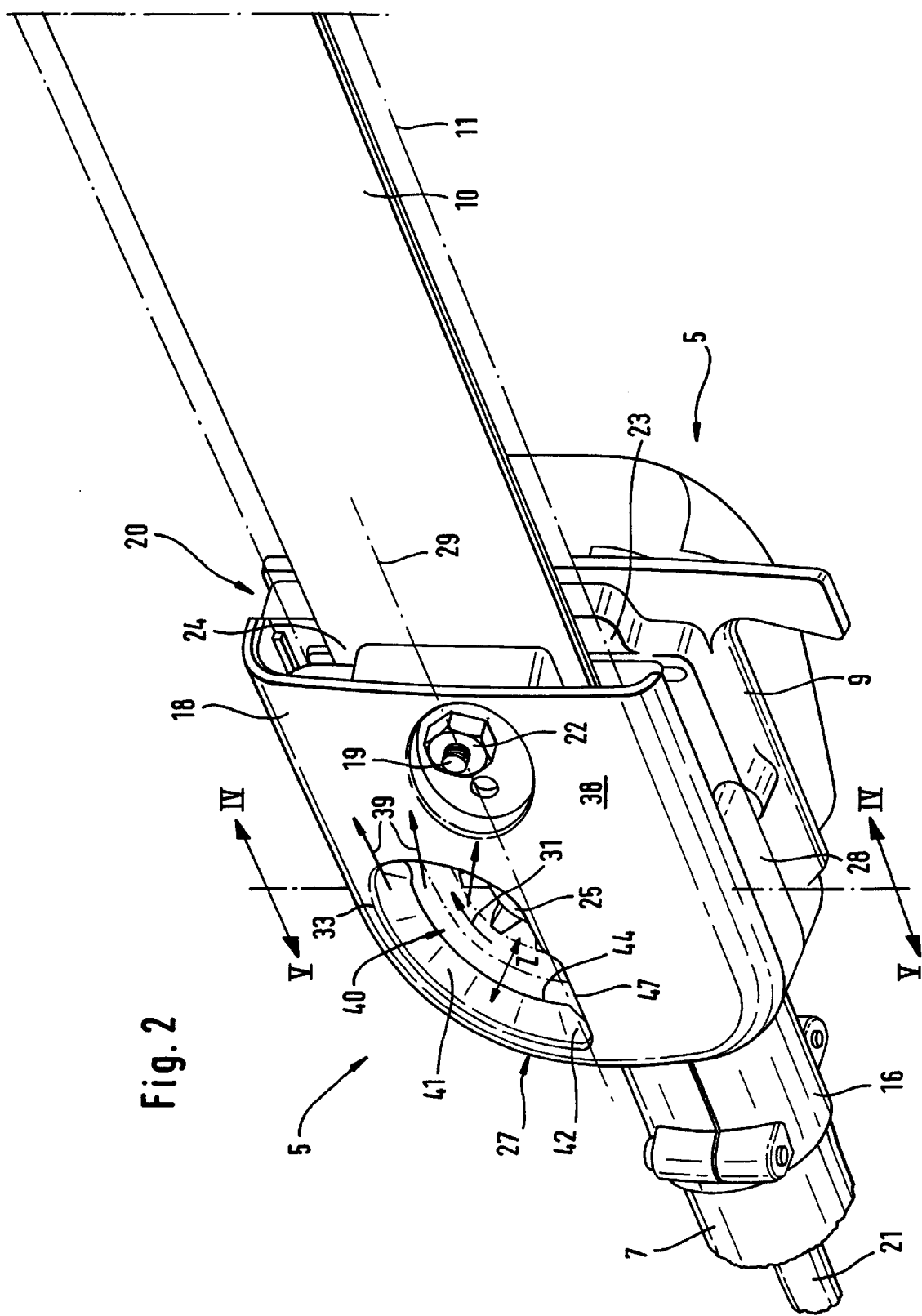
FIG. 2 shows an enlarged representation of a perspective view of the cutter head assembly of the tree pruner of FIG. 1.

As can be seen in FIG. 2, the cutter head includes a guide bar 10 and a saw chain 11 circulating thereon as well as fasteners 20 for mounting on the housing 9 of the cutter head 5. The fasteners 20 are comprised substantially of a drive pinion cover 18 being placed onto a fastening bolt 19 connected to the housing and secured by a clamping nut 22 against the housing wall 23 of the housing 9. One end 24 of the guide bar 10 is clamped between the housing wall 23 of the housing 9 and the pinion cover 18 and is thus fixedly secured at the housing 9 of the cutter head 5.

The drive pinion cover 18 covers the drive pinion 25 (FIG. 3) whereby the cover 18 is hood shaped and rests with its sidewalls 26, 28 forming the rim at the facing housing wall 23 of the housing 9. The sidewalls 2 extend, as in shown in FIG. 2, not only withing the deflection area 27 of the drive pinion 25 (sidewall 26) but also straight portions 28 neighboring the deflection area 27. The sidewalls 28 extend substantially parallel to the longitudinal center axis 29 of the drive pinion cover 18.

Figure 3:
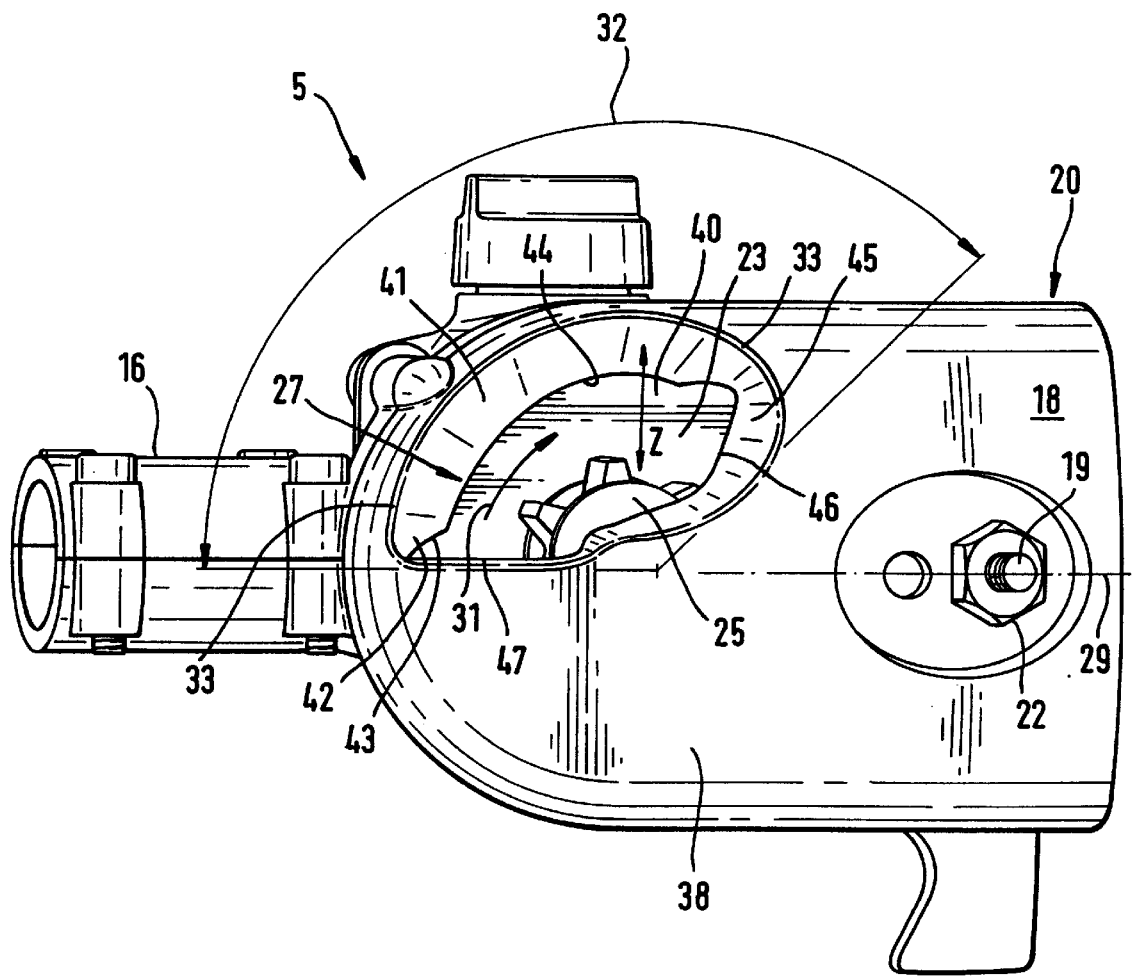
FIG. 3 shows a side view onto the drive pinion cover of the cutter head assembly.

As can be seen in FIGS. 2–5, between the sidewall 26 and the sidewalls 28 connected thereto without a gap, the drive pinion cover 18 and the housing side 23 a cuttings chamber 30 is delimited that is open toward the guide bar 10. For ejecting the wood cuttings produced during operation, the cover wall 38 opposite the housing wall 23, in the vicinity of the deflection area 27 of the saw chain 10, is provided with a cuttings ejection opening 40 which, as is shown in FIG. 3, is substantially shaped as a circular segment with a radius about a center which is in the vicinity of the axis of rotation 35 of the drive pinion 25. The cuttings ejection opening 40 extends in the circulating direction 31 of the drive pinion 25, respectively, of the saw chain 11 from the longitudinal center axis 29 over an angle 32 of preferably 90°, especially approximately 135°. Because of this design of the cuttings ejection opening 40, in the shown embodiment the drive pinion 25 is exposed within the cuttings ejection opening 40 about a circumferential angle of more than 90°.

The rim 33 of the cuttings ejection opening 40 is provided in the circulating direction 31 with a ramp 41 which in the shown embodiment is a unitary part of the cover 18 and is formed at the rim 33. The ramp 41 can also be a separate component which is secured between the housing side 23 and the cover 18. Also, the ramp 41 can be a unitary or integral part of the housing side 23 and then projects from the housing wall 23 into the cuttings ejection opening 40. The ramp 41, independent of its design, is spaced at a distance Z from the drive pinion 25, extends then arch-shaped in the circulating direction 31 and projects from the plane of the cover wall 38 into the cuttings chamber 30. For the purpose of removing the wood cuttings introduced into the cuttings chamber 30, the ramp 41 at its forward end 42 extends onto the plane of the housing side 23. The forward edge 43 of the forward end 42, which extends substantially perpendicularly to the circulating direction 31, preferably rests over a portion of its length at the housing wall 23 of the housing 9 that delimits the cuttings chamber 30. Expediently, the inner longitudinal edge 44 rests in the circulating direction 31 over a great portion (most of its length), preferably over its entire length, at the housing wall 23 of the housing 9 that delimits the cutting chamber 30. The ramp 41 with the housing wall 23 advantageously defines an obtuse angle 34 (FIG. 4, FIG. 5) opening toward the cuttings ejection opening 40.

Figure 4:
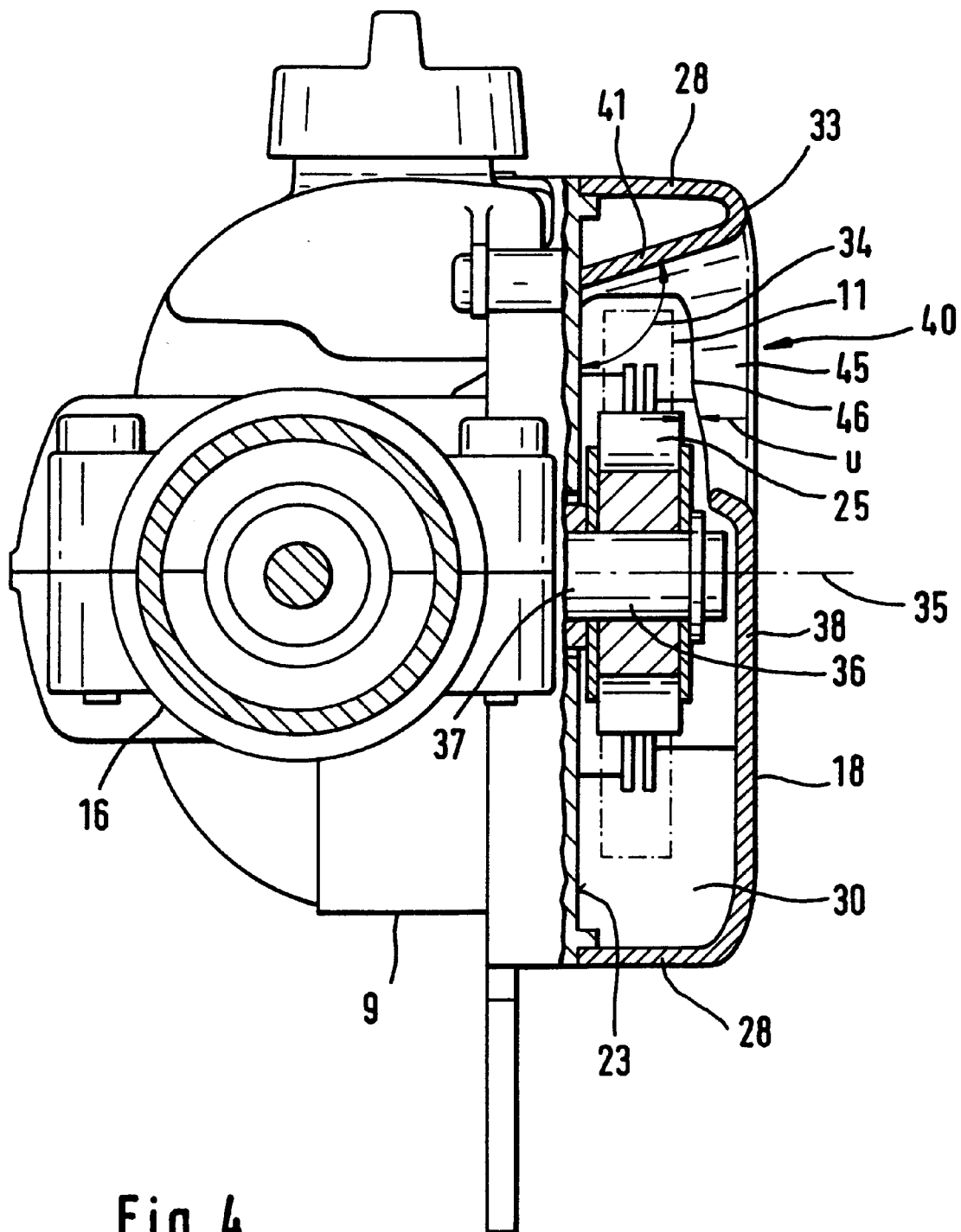
FIG. 4 shows a section of the drive pinion cover along the line IV—IV of FIG. 2.
Figure 5:
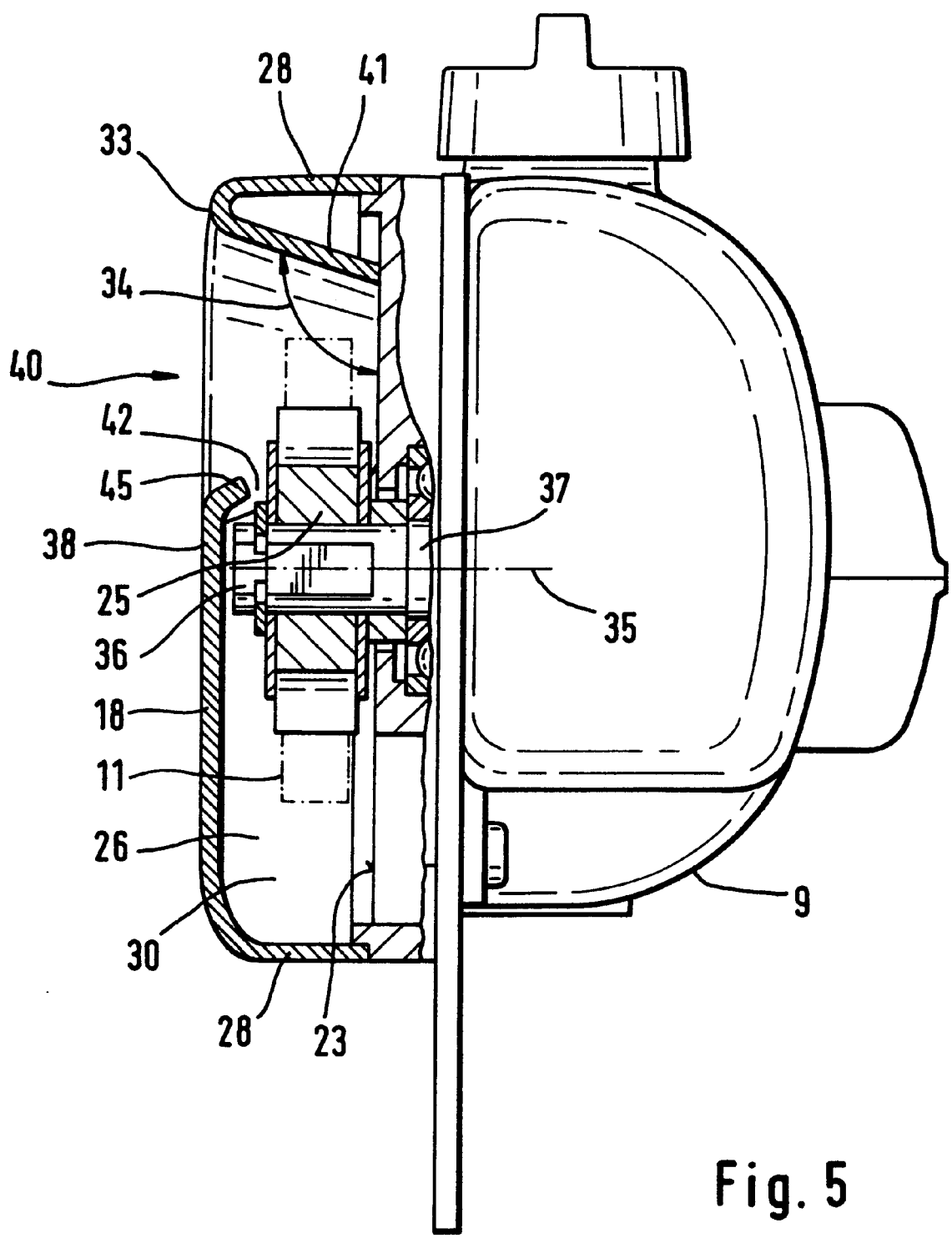
FIG. 5 is a section of the drive pinion cover along the line V—V of FIG. 2.

In the area of the rearward portion the ramp 41 is taken back by overcoming the spacing Z from the rim 33 to the drive pinion 25 whereby, as shown in FIG. 4, the longitudinal edge 46 of the rearward portion 45 is positioned with minimal lateral spacing u to the saw chain 11, respectively, the drive pinion 25. Preferably, at least the ramp 41, preferably also the cover 18 forming a unitary part with the ramp 41, is made of plastic material so that the spacing u can be maintained at a minimal value. Should, because of great tolerance fluctuations, a covering of the saw chain occur, the saw chain upon first operation can cut the required free space at the ramp 41. In this manner, a minimal spacing u is ensured.

The rearward portion 45 ends at the rim portion 47 extending substantially parallel to the longitudinal center axis 29 whereby the rim portion 47 itself if ramp-free. The ramp-free rim portion 47 connects the forward end 42 of the ramp 41 with the rear ward end 45. The rim portion has a length slightly greater than the spacing Z.

During operation of the cutter head, the resulting wood cuttings are partially entrained by the saw chain 11 into the cuttings chamber 30 and are then released in the outgoing deflection area 27 from the saw chain i.e., in the area of the drive pinion 25. These ejected wood cuttings oriented toward the ramp 41 are then guided outwardly along the ramp 41 to the cuttings ejection opening 40 so that they exit substantially at a slant laterally in the circulating direction 31 from the cuttings chamber 30 as is indicated by arrows 39 in FIG. 2. In order to maintain the considerable movement component away from the cuttings chamber in the direction toward the cuttings ejection opening 40, it may be expedient to embody the ramp 41 with increasing slant in a direction toward the rearward portion 45 in the circulating direction 31 or to design the geometry of the ramp 41 such that a desired and predetermined trajectory can be imparted to the emitted cuttings.

The drive pinion 25, which is covered over a large portion of its circumference by the drive pinon cover 18, is connected to the end 36 of the drive shaft 37 so as to rotate therewith, whereby the drive shaft 37 substantially extends at a right angle to the housing wall 23.

The specification incorporates by reference the disclosure of German priority document 197 53 360.4 of Dec. 2, 1997. The present invention is, of course, in no way restricted to the specific disclosure of the specification and drawings, but also encompasses any modifications within the scope of the appended claims.

What is claimed is:

1. A cutter head for a motor chainsaw, said cutter head comprising:

a cutter head housing (9);

a drive shaft (37) mounted in and projecting from said cutter head housing (9);

a drive pinion (25) mounted on a portion of said drive shaft (37) projecting from said cutter head housing (9);

a guide bar (10) having a first deflecting end positioned adjacent to said drive pinion (25);

a saw chain (11) driven by said drive pinion (25) and circulating in a circulating direction on said guide bar (10);

said saw chain (11) being deflected by said first deflecting end;

said cutter head housing (9) having an exterior housing wall (23);

a cover (18) connected to said exterior housing wall (23) of said cutter head housing (9);

said cover (18) and said housing wall (23) enclosing a cuttings chamber (3) open toward said guide bar (10);

said drive pinion (25) positioned in said cuttings chamber (3);

said first end of said guide bar (10) clamped between said housing wall (23) of said cutter head housing (9) and said cover (18);

wherein said cover (18) has a cuttings ejection opening (40) opposite said housing wall (23) in the vicinity of said first end of said guide bar in an area where said saw chain is deflected in a direction of exiting said cuttings chamber (3) in said circulating direction;

wherein said cuttings ejection opening (40) has a rim (33, 47) with a first rim portion (33), said first rim portion (33) having a curvature configured to match a curvature of said first deflecting end); and wherein said cuttings ejection opening (40) has a ramp (41) extending from said first rim portion (33) into said cuttings chamber (30).

2. A cutter head according to claim 1, wherein said ramp (41) is connected directly to said first portion of said rim (33).

3. A cutter head according to claim 1, wherein said ramp (41) has a rearward end (45) in said circulating direction (31) and wherein said rearward end (45) has an increasing slant angle.

4. A cuter head according to claim 3, wherein said rearward end (45) extends from said rim (33) toward said drive pinion (25).

5. A cutter head according to claim 3, wherein said rearward end (45) of said ramp (41) has an edge (46) positioned closely to said saw chain (11) and to said drive pinion (25).

6. A cutter head according to claim 1, wherein said ramp (41) is a part of said cover (18) and has an edge (44) opposite said rim (33), wherein said edge (44) rests at said housing wall (23) over most of a length of said rim (44).

7. A cutter head according to claim 1, wherein said ramp (41) and said housing wall (23) define an obtuse ejection angle (34) in a direction toward said cuttings ejection opening (40).

8. A cutter head according to claim 1, wherein said rim has a second portion (47) extending parallel to a longitudinal center axis (29) of said cover (18) and wherein said second portion (47) is ramp-free.

9. A cutter head according to claim 1, wherein said cover (18) has a first sidewall (26) in said area of outgoing deflection of said saw chain (11) and a neighboring straight sidewall (28), wherein said cover (18) rests at said housing wall (23) over an entire extension of said first sidewall (26) and said neighboring straight sidewall (28).

10. A cutter head according to claim 1, wherein said cuttings ejection opening (40) begins at a longitudinal center axis (29) of said cover (18) and extends over an angle of at least 90° in the circulating direction (31) of said chain saw (11).

11. A cutter head according to claim 10, wherein said angle is 135°.

12. A cutter head according to claim 1, wherein said cutting ejection opening (40) in a plan view is a circular arc segment having a center of origin in the vicinity of an axis of rotation of said drive pinion (25).

13. A cutter head according to claim 1, wherein said drive pinion (25) is exposed in said cutting ejection opening (40) over a circumferential angle of more than 90°.

14. A cutter head according to claim 1, wherein said ramp (41) is an integral part of said cover (18).

15. A cutter head according to claim 14, wherein said cover (18) with said ramp (41) consists of plastic material.

* * * * *

UNITED STATES PATENT AND TRADEMARK OFFICE
CERTIFICATE OF CORRECTION

PATENT NO  : 6,112,419
DATED      : September 5, 2000
INVENTOR(S): Klaus-Martin Uhl, Joachim Hoffmann,
             Berthold Schell, and Karl-Otto Stimpfig It is certified that error appears in the above-identified patent and that said Letters Patent are hereby corrected as shown below:

On the Title Page, the following item should read as follows:

[75] Inventors:

Klaus-Martin Uhl, Joachim Hoffmann,
Berthold Schell, and Karl-Otto Stimpfig

Signed and Sealed this

Fifteenth Day of May, 2001

Attest:

NICHOLAS P. GODICI

Attesting Officer     Acting Director of the United States Patent and Trademark Office